(12) United States Patent
Jahromi

(10) Patent No.: US 8,749,887 B2
(45) Date of Patent: Jun. 10, 2014

(54) TELESCOPIC GUN SIGHT WITH LINEAR OPTICAL ADJUSTMENT MECHANISM

(76) Inventor: Omid S. Jahromi, McLean, VA (US)

( * ) Notice: Subject to any disclaimer, the term of this patent is extended or adjusted under 35 U.S.C. 154(b) by 398 days.

(21) Appl. No.: 13/019,763

(22) Filed: Feb. 2, 2011

(65) Prior Publication Data

US 2012/0192478 A1   Aug. 2, 2012

(51) Int. Cl.
*G02B 27/64* (2006.01)
*G02B 23/14* (2006.01)
*F41G 1/38* (2006.01)

(52) U.S. Cl.
CPC .............. *G02B 27/648* (2013.01); *G02B 23/14* (2013.01); *F41G 1/38* (2013.01)
USPC .............................. 359/557; 359/399; 359/429

(58) Field of Classification Search
CPC ........ G02B 23/12; G02B 23/14; G02B 27/64; G02B 27/646; F41G 1/04; F41G 1/38
USPC .............. 359/211.1, 399, 554, 557, 424–429, 359/831
See application file for complete search history.

(56) References Cited

U.S. PATENT DOCUMENTS

| | | | | |
|---|---|---|---|---|
| 1,725,070 | A * | 8/1929 | French | 356/256 |
| 3,161,716 | A | 12/1964 | Burris et al. | |
| 4,364,628 | A * | 12/1982 | Garner | 359/557 |
| 4,822,974 | A * | 4/1989 | Leighton | 219/121.67 |
| 5,463,495 | A | 10/1995 | Murg | |
| 5,615,487 | A | 4/1997 | Tomita | |
| 6,707,533 | B2 * | 3/2004 | Mishima | 355/53 |
| 7,069,684 | B2 * | 7/2006 | Smith, III | 42/122 |
| 7,142,357 | B2 * | 11/2006 | Greenslade | 359/353 |
| 2005/0039370 | A1 * | 2/2005 | Strong | 42/130 |
| 2007/0221825 | A1 * | 9/2007 | Chen | 250/208.1 |

* cited by examiner

Primary Examiner — Thong Nguyen

(57) ABSTRACT

Telescopic sights commonly include a reticle which is laterally moved to adjust for the point of aim. In this invention, a prismatic device is used to move the image of the target on the reticle. In one embodiment, a pair of prisms are placed in the optical path of a telescopic sight such that at least one prism is movable along the optical axis. The point of aim is adjusted by adjusting the distance between the two prisms. By replacing the lateral movement of the reticle with the longitudinal movement of a prism, this invention eliminates several drawbacks associated with the prior art including limitations in the adjustment range.

6 Claims, 6 Drawing Sheets

US 8,749,887 B2

TELESCOPIC GUN SIGHT WITH LINEAR OPTICAL ADJUSTMENT MECHANISM

I. CROSS-REFERENCE TO RELATED APPLICATIONS

Not Applicable

II. FEDERALLY SPONSORED RESEARCH

Not Applicable

III. SEQUENCE LISTING OR PROGRAM

Not Applicable

IV. FIELD OF THE INVENTION

This application relates to optical gun sights, specifically to an improved method of adjusting the point of aim in telescopic gun sights.

V. BACKGROUND OF THE INVENTION

A telescopic gun sight, commonly called a rifle scope, is a device used to provide an accurate point of aim for firearms such as rifles, handguns and shotguns. It is used with other types of weapons such as bows and crossbows as well. A telescopic sight can dramatically improve the functionality of a firearm by providing the shooter with a simple yet highly accurate means for aiming at distant targets.

A simplified schematic diagram of a modern telescopic sight is shown in FIG. 1. With reference to this figure, a telescopic sight uses an objective lens or lens group 1 to form a real image of the target at the objective focal plane 4. The image formed by the objective is upside-down and needs to be erected. The pair of convex lenses 3a and 3b erect the image formed by the objective and relay it to the eyepiece focal plane 5. Finally, an ocular (eyepiece lens) 2 is used to convert this erected real image into a virtual image at infinity for viewing by the shooter.

In telescopic sights, the "point of aim" is usually designated by a reticle or cross hairs. Reticles are most commonly represented as intersecting lines in a "+" shape though many variations exist, including dots, posts, circles, scales, chevrons, or a combination of each. With reference to FIG. 1, the reticle is placed either at the objective focal plane 4 or the eyepiece focal plane 5. These two planes are also referred to as the First Focal Plane (FFP) and the Second Focal Plane (SFP), respectively. In either case, the reticle's shape is superimposed on the target image providing a precise indication of the point of aim.

Modern telescopic sights are equipped with at least two control knobs for elevation (up-down) and windage (left-right) adjustments. These knobs allow for precise vertical and horizontal movement of the reticle so that the sight's point of aim can be aligned with the firearm's "point of impact".

It is very desirable to be able to keep the reticle at the center of field of view while its position is adjusted inside the telescopic sight. To achieve this, almost all rifle scopes manufactured today use a tilting inner tube mechanism similar to the one disclosed in U.S. Pat. No. 3,161,716 issued Dec. 15, 1964 to D. J. Burris and J. L. Maulbetsch. A simplified version of this mechanism is shown in FIG. 1.

With reference to FIG. 1, the mechanism to keep the reticle at the center of field of view includes an inner tube 6 that contains the reticle 20 and the image erection lenses 3a and 3b. The back end of the inner tube 6 is connected to the main casing 10 by a special joint 7. The front end of the inner tube 6 is connected to an adjustment knob 8 and is supported by a leaf spring 9. Adjusting the knob 8 tilts the inner tube 6 up and down. This, in turn, moves the reticle 20 which is mounted inside the inner tube with respect to the target image formed by the objective and adjusts the point of aim. Since the reticle and the erecting lenses 3a and 3b are tilted together, the reticle image always appears at the center of field of view. (Note: For simplicity and clarity, only up-down adjustment is shown in FIG. 1. Adjustment for left-right is achieved similarly by tilting the inner tube side ways.)

The tilting inner tube mechanism described above is used by almost all rifle scope manufacturers today. However, it has several drawbacks:

A first drawback is that the possible amount of reticle adjustment is limited to the clearance between the inner tube and the scope's main tube. Telescopic sights must use a standard main tube diameter (one inch in the US and 30 millimeters in Europe). Furthermore, optical considerations make using a small diameter inner tube impractical. Therefore, the titling tube mechanism is naturally limited in terms of the amount of elevation and windage adjustments possible.

A second drawback is that due to the circular shape of the inner tube and the scope's main tube, vertical and horizontal movements of the inner tube interfere with each other near the ends of the adjustment range. For example, if the inner tube is tilted upwards near the end of its adjustment range, then it can not move much in the left and right directions. This phenomenon is shown graphically in FIG. 2. In this figure, the circular region 22 indicates the maximum amount of adjustment possible in each direction while the smaller rectangular region 21 indicates the area in which elevation and windage can be adjusted independently without one limiting the other.

A third drawback of the tilting inner tube solution is that it requires a precise and expensive joint mechanism (often implemented as a ball-and-socket joint) at its rear end. This joint must allow the inner tube to tilt up-down and left-right with very high degree of precision and also withstand the shock and vibrations caused by the weapon's recoil force.

A forth drawback is that the adjustment knob and the return spring used to tilt the inner tube must be of very high quality and without hysteresis. These conditions are very difficult to satisfy in practice and even the highest quality rifle scopes manufactured today are susceptible to shift in their point of aim if their adjustment knobs are turned and then reverted back to the original position.

The reader is referred to U.S. Pat. No. 5,463,495 issued Oct. 31, 1995 to E. Murg and U.S. Pat. No. 5,615,487 issued Apr. 1, 1997 to S. Tomita for more information on the difficulties associated with the design of the tilting inner tube mechanism.

This patent teaches an optical method for adjusting the point of aim in a telescopic sight wherein the reticle is fixed with respect to the sight's optical axis. This method eliminates the issues associated with the tilting-inner-tube solution used in the prior art.

VI. SUMMARY OF THE INVENTION

In this invention an optical method for elevation and windage adjustment in telescopic gun sights is disclosed. Instead of moving the reticle mechanically, a prismatic optical system is used to shift the image of the target on the reticle. This method eliminates the drawbacks associated with the prior art.

In accordance with one embodiment, this invention introduces a telescopic gun sight comprising an objective lens, a reticle, an image erecting means, an eyepiece lens, and a pair of prisms, wherein said prisms are positioned between said objective lens and said reticle so that changing the linear separation between the prisms adjusts the point of aim.

VII. BRIEF DESCRIPTION OF THE DRAWINGS

The foregoing aspects and many of the attendant advantages of this invention will become more readily apparent with reference to the following detailed description of the invention, when taken in conjunction with the appended claims and accompanying drawings, wherein:

VIII. DETAILED DESCRIPTION OF THE INVENTION

It is well-known in optics that a prism bends light rays that pass trough it. The bending angle, called angular deviation $\alpha$, depends on several factors including the angle of incidence of the incoming ray with respect to the prism surface facing it, the apex angle of the prism, and the wavelength of the incident ray. When two identical prisms are placed in the path of a monochromatic light ray with one prism flipped upside down, the angular deviations resulting from the prisms will cancel each other out and the output ray will be parallel with the input. However, the output ray will be displaced depending on the distance between the prisms and the angular deviation caused by the first prism.

Figure 1:
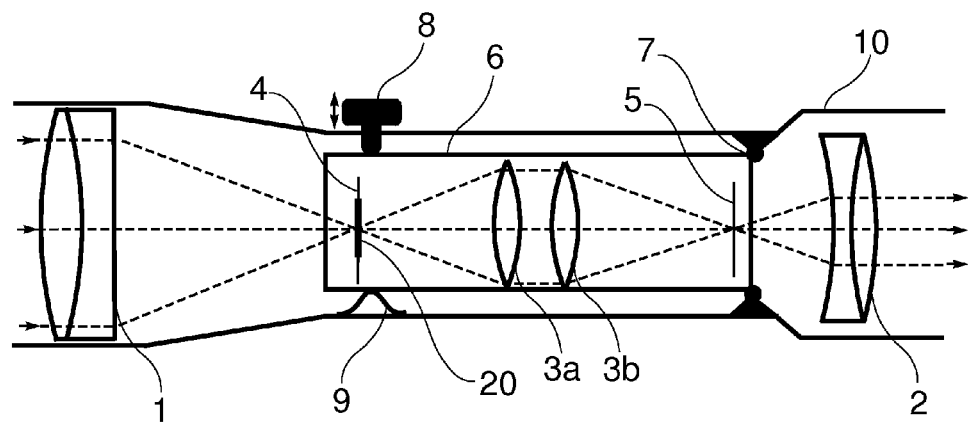
FIG. 1 is a side view schematic illustrating the arrangement of elements in a conventional telescopic gun sight (prior art).
Figure 2:
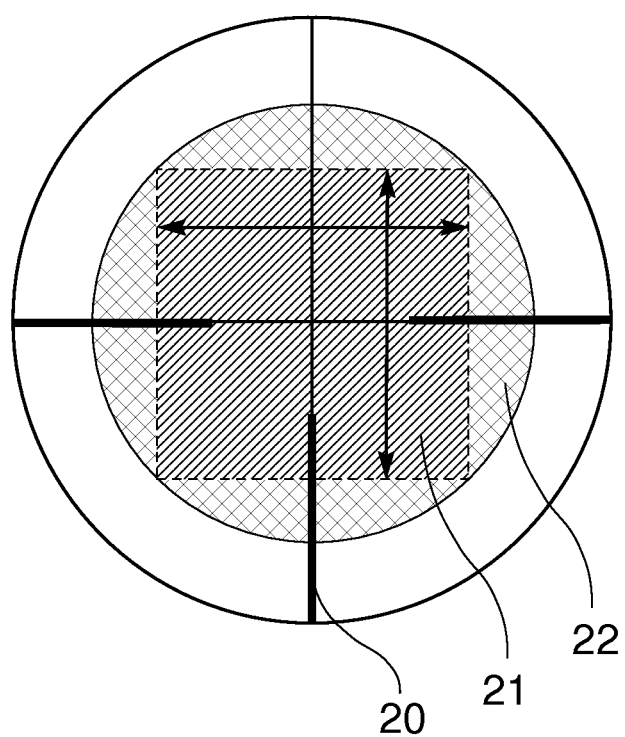
FIG. 2 is an illustration of the interdependence of elevation and windage adjustments in the prior art.
Figure 3:
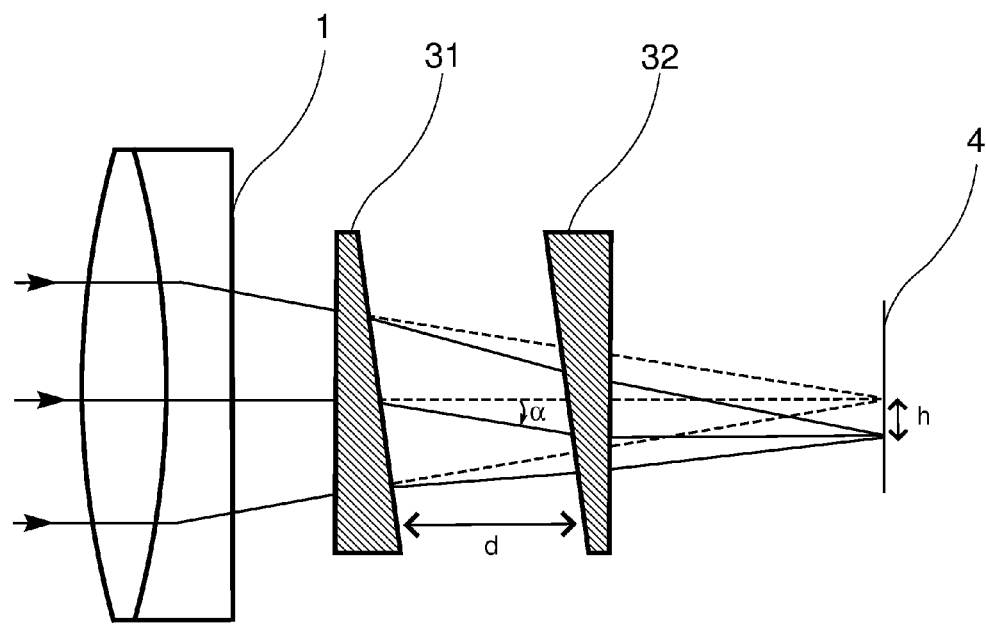
FIG. 3 is an illustration of the principle of image shift using two prisms.

Consider the arrangement shown in FIG. 3. In this figure, a pair of thin prisms 31 and 32 are placed in the focused beam produced by an objective lens 1. The prisms are identical but one prism is mounted upside down such that its base faces the apex of the other prism. Furthermore, the prisms are mounted such that one of them can move back and force along the optical axis of the objective. Any change in the linear separation between the two prisms will cause a lateral shift in the position of the image formed on the objective focal plane 4. The amount of this lateral shift, denoted h, is given by $h = d \times \tan \alpha$ where d is the linear separation between the prisms and $\alpha$ is the angular deviation imposed on the central image ray by the first prism. For thin prisms, the angular deviation $\alpha$ is very small (a few degrees) which means $\tan \alpha$ will be very small as well. This makes it possible to impose precise lateral shifts h on the image generated by the objective lens.

The angular deviation of a prism varies slightly based on the wavelength and the incidence angle of an input light ray. Therefore, placing prisms in the beam path of an objective lens will add certain amounts of chromatic abberation as well as spherical and other abberations (such as astigmatism) to the image produced by it. These abberations are very small in practice and can be easily compensated in the overall design of the telescopic sight. These abberations may be further reduced by using achromatic prism. The theory of light deviation by thin prisms can be found in several textbooks such as *Modern Optical Engineering, 4th Ed.* by Warren J. Smith, McGraw-Hill, New York, N.Y., 2008, ISBN 978-0-07-147687-4. This book includes detailed sections on achromatic prisms and the aberration caused by placing plane parallel optical elements in the focused beam of an objective lens (Sections 7.5 and 7.8, respectively). Those skilled in the art would be familiar with these aberrations and could readily design the overall optical system of a telescopic sight to minimize or even eliminate them.

A. First Embodiment of the Invention

Figure 4:
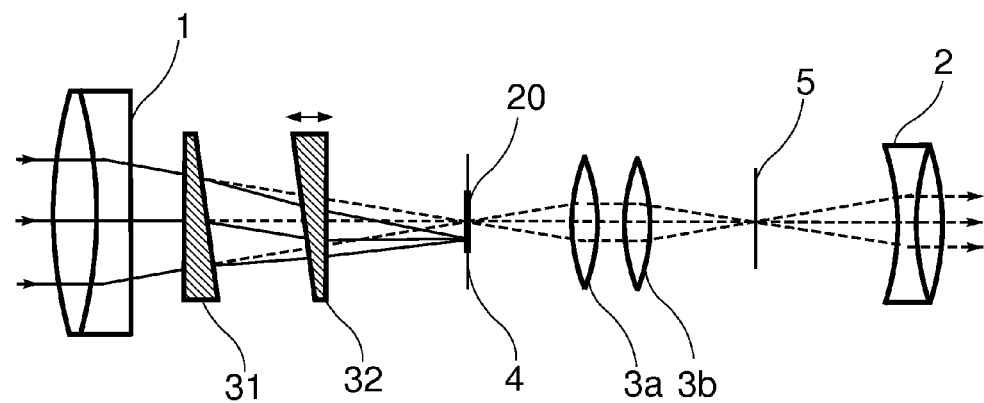
FIG. 4 is a side view schematic depicting the arrangement of elements in a first embodiment of the invention.

A first embodiment of the invention is shown in FIG. 4. In this embodiment a telescopic sight includes an objective lens 1 which forms a first image of the target on the objective focal plane 4. A reticle 20 is placed at the objective focal plane. The first image produced by the objective lens is upside down and laterally reversed. A pair of convex lenses 3a and 3b relay this first image to the eyepiece focal plane 5 and form a second, upright and laterally correct image there. The eyepiece 2 takes this second image and produces a virtual magnified image for the shooter to see.

Two thin prisms 31 and 32 are placed after the objective lens 1 and before objective focal plane 4. One of these prisms is mounted upside down such that its base faces the apex of the other prism. Furthermore, the prisms are mounted such that at least one prism can move along the optical axis of the objective. (In FIG. 4, prism 32 is designated as the movable prism.) A mechanical adjustment means controlled by an external knob is used to allow an operator to move prism 32 along the optical axis. (Details of the mechanical adjustment means is not essential to the present invention and therefore is not shown in FIG. 4.) Moving prism 32 along the optical axis causes the image produced by the objective lens 1 to shift with respect to the reticle 20 in the up-down direction. This shift adjusts the sight's point of aim for elevation.

Note: For simplicity and clarity, only elevation adjustment is shown in FIG. 4. A second pair of prisms, rotated by 90 degrees, can be placed in the optical path of the objective lens to adjust the point of aim for windage. Persons skilled in the art would be familiar with adapting the method shown in FIG. 4 for windage adjustment therefore we omit the details of such adaptation here.

To use the telescopic sight described in this embodiment, an operator (shooter) places his eye at the rear end of the telescopic sight behind the eyepiece lens 2 and points it towards a target. He will see a virtual image of the target with an image of the reticle 20 superimposed. This enables him to determine his point of aim on the target. To adjust the point of aim for elevation, the shooter shifts the position of the movable prism 32 along the optical axis via a mechanical adjustment means controlled by an external knob. (Again, we mention that this mechanical adjustment means is not shown in FIG. 4. Persons skilled in the art would be familiar with the design of a suitable mechanical adjustment means. Such means are commonly used for moving internal focusing lenses in binoculars, rifle scopes and other optical instruments.)

B. Second Embodiment of the Invention

Figure 5:
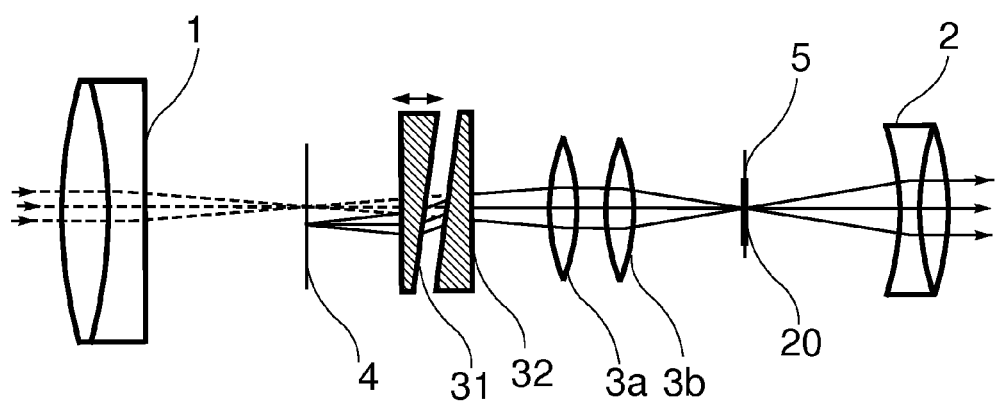
FIG. 5 is a side view schematic depicting the arrangement of elements in a second embodiment of the invention.

A second embodiment of the invention is shown in FIG. 5. In this embodiment the pair of prisms 31 and 32 are placed after the objective focal plane 4 and before the erecting lenses 3a and 3b. The reticle 20 is placed at the eyepiece focal plane 5. Other than these changes, the arrangement of elements is similar to the first embodiment.

To adjust the point of aim, one of the prisms 31 and 32 is moved forward or backward along the optical axis of the sight. This will cause the real image produced by the relay lenses 3a and 3b to shift upward and downward on the eyepiece focal plane 5. Since the reticle 20 is mounted coplanar with the eyepiece focal plane 5, the target image shifts on the reticle and an adjustment for point of aim is provided.

C. Third Embodiment of the Invention

Figure 6:
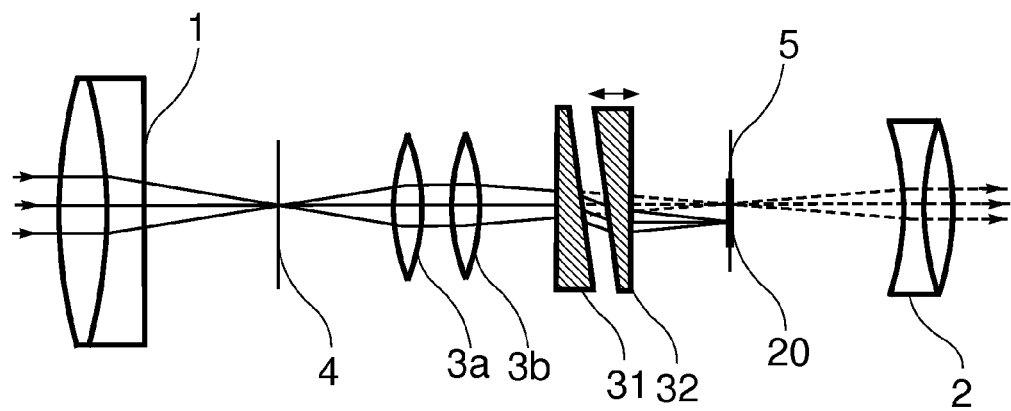
FIG. 6 is a side view schematic depicting the arrangement of elements in a third embodiment of the invention.

A third embodiment of the invention is shown in FIG. 6. The arrangement of elements in this embodiment is similar to the second embodiment above except that the pair of prisms 31 and 32 are placed after the erecting lenses 3a and 3b and before the eyepiece focal plane 5. The reticle 20 is placed at the eyepiece focal plane 5.

The operation of this embodiment is similar to the second embodiment: To adjust the point of aim, one of the prisms 31 and 32 is moved forward or backward along the optical axis of the sight. This will cause the real image produced by the relay lenses 3a and 3b to shift upward and downward on the eyepiece focal plane 5. Since the reticle 20 is mounted coplanar with the eyepiece focal plane 5, the target image shifts with respect to the reticle and the sight's point of aim is adjusted.

D. Advantages

Based on the above descriptions of some embodiments of the invention, a number of advantages of one or more aspects over prior art are readily apparent:
1. Reduced weight and bulk: The optical adjustment method described in this patent allows for virtually any amount of elevation or windage adjustment in a scope with arbitrary main tube diameter. There is no need to use a large main tube (which results in extra bulk and weight) to achieve large elevation or windage adjustment ranges.
2. Fully-independent elevation and windage adjustment: The optical adjustment method described in this invention can produce completely independent adjustments for elevation and windage. This is not possible with the tilting-inner-tube method used in the prior art.
3. Multi-stage adjustment possible: It is possible to place a coarse adjustment mechanism and a fine adjustment mechanism in successive stages along the optical path of a telescopic sight. A multi-stage implementation could allow for quick dialing of large elevation values using separate fine-tuning and a coarse-tuning knobs.
4. Repeatable return to zero: The linear movement used for shifting the prisms is a forced mechanical movement. In contrast, the adjustment method used in the prior art is a tilting movement supported by spring tension. It is clear to persons skilled in the art that the solution described in this patent leads to a much more reliable adjustment system.
5. Easier and potentially cheaper manufacturing: The optical adjustment mechanism described in this invention eliminates the need for the precision ball-and-socket joint which is necessary in the prior art. In the present invention the inner tube is only necessary for zoom scopes and, if present, can be simply fixed to the main body of the telescopic sight.

These and other advantages of one or more aspects may now be apparent to the reader from a consideration of the foregoing description and accompanying drawings.

IX. CONCLUSION, RAMIFICATIONS, AND SCOPE

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention.

While the above descriptions of the present invention contain numerous specificities, they should not be construed as limiting the scope of the invention, but as mere illustrations of some of the preferred embodiments thereof. Many other ramifications and variations are possible within the expositions of the various embodiments. For example:
1. It is possible to omit the non-movable prism and achieve vertical or horizontal point of aim adjustment with only one movable prism. For example, in the first embodiment of the invention shown in FIG. 4 one may omit prism 31 and simply move prism 32 along the optical axis of the objective to create a desired amount of image shift h on the objective focal plane 4. In this case the amount of image shift will depend on the linear distance between the prism 32 and the objective focal plane 4. The amount and the nature of chromatic and other abberations introduced in this case would be deferent from the case where two prisms are used.
2. To reduce chromatic and other abberations, one may use achromatic prism (i.e. prisms made of two or more layers of glass, each layer having a different refractive index) and also impose a certain amount of curvature to the prism surfaces.
3. The erecting lenses 3a and 3b shown in FIGS. 1, 3, 4 and 5 can be replaced by a prismatic image erecting means. Those skilled in the art are familiar with adapting a prismatic erecting means instead of the lens-based one described in the above embodiments.
4. For simplicity and brevity, point of aim adjustment in only one direction is discussed in the description of the embodiments above. It is understood that by applying knowledge within the skill of the art, one can readily modify and/or adapt the methodology described in this invention for adjusting a telescopic sight's point of aim in both vertical and horizontal directions.

Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance. Thus, the scope of the invention should be determined by the appended claims and their legal equivalents, as opposed to the embodiments illustrated.

What is claimed is:

1. A telescopic sight for designating a weapon's point of aim when pointed at a target, comprising:
   a. an objective lens for forming a first image of the target, said objective lens having a first focal plane and an optical axis,
   b. an image-erecting means for converting said first image into an upright and laterally-correct second image, said image erecting means being positioned on the objective optical axis after said objective,
   c. an eyepiece lens for converting said second image into a virtual third image of the target for convenient viewing by an operator, said eyepiece lens having a second focal plane, said eyepiece lens being positioned on the objective optical axis after said image erecting means, d. a reticle for indicating the point of aim, said reticle being mounted coplanar with either said first focal plane or said second focal plane, and e. a first prism for lateral shifting of said first image on said first focal plane, said first prism having an apex and a base, said first prism being positioned on the objective optical axis between the objective lens and said first focal plane, said first prism being mounted such that it can move linearly along the objective optical axis, said first prism's linear movement being mechanically adjustable by the operator, whereby the operator can view and use said third image of the target for the purpose of aiming and adjust his point of aim by adjusting the linear movement of said first prism along the objective optical axis.

2. The telescopic sight of claim 1 further including a second prism, said second prism having an apex and a base, said second prism being positioned on the objective optical axis between said objective lens and said first focal plane, said second prism being positioned facing said first prism, said second prism being positioned such that its base faces the apex of said first prism.

3. A telescopic sight for designating a weapon's point of aim when pointed at a target, comprising:

a. an objective lens for forming a first image of the target, said objective lens having a focal plane and an optical axis, b. an image-erecting means for converting said first image into an upright and laterally-correct second image, said image erecting means being positioned on the objective optical axis after said objective lens, c. an eyepiece lens for converting said second image into a virtual third image of the target for convenient viewing by an operator, said eyepiece lens having a focal plane, said eyepiece lens being positioned on the objective optical axis after said image erecting means, d. a reticle for indicating the point of aim, said reticle being mounted on the objective optical axis between said image-erecting means and said eyepiece lens, said reticle being positioned coplanar with the eyepiece focal plane, and e. a first prism for lateral shifting of said second image on the eyepiece focal plane, said first prism having an apex and a base, said first prism being positioned on the objective optical axis between the objective focal plane and said image-erecting means, said first prism being mounted such that it can move linearly along the objective optical axis, said first prism's linear movement being mechanically adjustable by the operator, whereby the operator can view and use said third image of the target for the purpose of aiming and adjust his point of aim by adjusting the linear movement of said first prism along the objective optical axis.

4. The telescopic sight of claim 3 further including a second prism, said second prism having an apex and a base, said second prism being positioned on the objective optical axis between the objective focal plane and said image-erecting means, said second prism being positioned facing said first prism, said second prism being positioned such that its base faces the apex of said first prism.

5. A telescopic sight for designating a weapon's point of aim when pointed at a target, comprising:

a. an objective lens for forming a first image of the target, said objective lens having a focal plane and an optical axis, b. an image-erecting means for converting said first image into an upright and laterally-correct second image, said image erecting means being positioned on the objective optical axis opposite said objective lens, c. an eyepiece lens for converting said second image into a virtual third image of the target for convenient viewing by an operator, said eyepiece lens having a focal plane, said eyepiece lens being positioned on the objective optical axis after said image erecting means, d. a reticle for indicating the point of aim, said reticle being mounted on the objective optical axis between said image-erecting means and said eyepiece lens, said reticle being positioned coplanar with the eyepiece focal plane, and e. a first prism for lateral shifting of said second image on the eyepiece focal plane, said first prism having an apex and a base, said first prism being positioned on the objective optical axis between said image-erecting means and the eyepiece focal plane, said first prism being mounted such that it can move linearly along the objective optical axis, said first prism's linear movement being mechanically adjustable by the operator, whereby the operator can view and use said third image of the target for the purpose of aiming and adjust his point of aim by adjusting the linear movement of said first prism along the objective optical axis.

6. The telescopic sight of claim 5 further including a second prism, said second prism having an apex and a base, said second prism being positioned on the objective optical axis adjacent to said first prism, said second prism being positioned facing said first prism, said second prism being positioned such that its base faces the apex of said first prism.

* * * * *